US012794207B2

(12) United States Patent
Cooper et al.

(10) Patent No.: US 12,794,207 B2
(45) Date of Patent: Nov. 10, 2026

(54) GROUND CONES FOR PROVIDING ELECTRICAL CONTACT IN GROUNDING OF AN ELECTRICAL SYSTEM

(71) Applicant: ABB Schweiz AG, Baden (CH)

(72) Inventors: Anthony Cooper, Memphis, TN (US); Andy Jaffari, Memphis, TN (US); Omar Lopez, Memphis, TN (US)

(73) Assignee: ABB Schweiz AG, Baden (CH)

( * ) Notice: Subject to any disclaimer, the term of this patent is extended or adjusted under 35 U.S.C. 154(b) by 583 days.

(21) Appl. No.: 18/462,811

(22) Filed: Sep. 7, 2023

(65) Prior Publication Data

US 2025/0087985 A1 Mar. 13, 2025

(51) Int. Cl.
*H01R 13/00* (2006.01)
*H01R 13/648* (2006.01)
*H02G 3/04* (2006.01)
*H02G 15/04* (2006.01)

(52) U.S. Cl.
CPC ........... *H02G 15/04* (2013.01); *H01R 13/648* (2013.01); *H02G 3/0406* (2013.01)

(58) Field of Classification Search
CPC .... H02G 15/04; H02G 3/0406; H02G 3/0675; H02G 3/0691; H01R 13/648; H01R 4/56; H01R 4/643; H01R 4/60; H01R 4/66
See application file for complete search history.

(56) References Cited

U.S. PATENT DOCUMENTS 5,929,383 A * 7/1999 Marik .................... H02G 15/04 439/98
6,034,326 A * 3/2000 Jorgensen ............ H02G 3/0691 174/661
2004/0177988 A1* 9/2004 Kiely ................... H02G 3/0691 174/656
2007/0163804 A1* 7/2007 Auray .................. H02G 3/0691 174/666
2008/0149388 A1* 6/2008 Kiely ................... H01R 13/745 174/659
2008/0268687 A1* 10/2008 Dixon .................. H02G 3/0675 439/320

(Continued)

FOREIGN PATENT DOCUMENTS

EP 2592322 A1 5/2013

OTHER PUBLICATIONS

European Office Action for Application No. 24198695.9, dated Jan. 29, 2025, 5 pages.

*Primary Examiner* — Abdullah A Riyami
*Assistant Examiner* — Nelson R. Burgos-Guntin
(74) *Attorney, Agent, or Firm* — McCarter & English, LLP; Michael M. Gnibus

(57) ABSTRACT

A ground cone for providing electrical contact to an interior of a conduit is provided. The ground cone includes a cone body including one or more tabs positioned on the cone body and extending radially outward from the cone body, the one or more tabs positioned separately from one another. At least one of the one or more tabs has a helical edge, the helical edge shaped to be received in a groove of a thread. The cone body includes a cap end and a bottom end opposite the cap end. The ground cone also includes a cap extending longitudinally from the cone body at the cap end and extending toward the bottom end. The cone body and the cap define a channel sized to receive an end of a conduit therein.

20 Claims, 6 Drawing Sheets

(56) References Cited

U.S. PATENT DOCUMENTS

| | | | | |
|---|---|---|---|---|
| 2013/0118802 | A1* | 5/2013 | Dinh | H01R 43/20 174/77 R |
| 2013/0157491 | A1* | 6/2013 | Chavan | H02G 3/0691 439/210 |
| 2014/0097023 | A1* | 4/2014 | Dinh | H02G 15/04 174/77 R |
| 2015/0068332 | A1* | 3/2015 | Bakken | H02G 3/0406 74/25 |
| 2015/0136473 | A1* | 5/2015 | Jafari | H02G 3/0691 29/525.01 |
| 2017/0276272 | A1* | 9/2017 | Nakai | H02G 3/00 |
| 2023/0253729 | A1* | 8/2023 | Lopez | F16L 19/065 |

* cited by examiner

GROUND CONES FOR PROVIDING ELECTRICAL CONTACT IN GROUNDING OF AN ELECTRICAL SYSTEM

BACKGROUND

The field of the disclosure relates generally to electrical systems, and more particularly, to ground cones for grounding in an electrical system.

Conduits and conduit assemblies are used to carry and protect electrical wiring or cabling in an electrical system. Conduit assemblies are constructed by coupling lengths of conduits with fittings. To ensure the performance and safety of the conduit assembly, electrical continuity of the conduit assembly is required to pass certain testing. Ground cones are used to provide electrical contact of the interior of the conduit with the rest of the conduit assembly. Known methods and assemblies are disadvantaged in some aspects and improvements are desired.

BRIEF DESCRIPTION

In one aspect, a ground cone for providing electrical contact to an interior of a conduit is provided. The ground cone includes a cone body including one or more tabs positioned on the cone body and extending radially outward from the cone body, the one or more tabs positioned separately from one another. At least one of the one or more tabs has a helical edge, the helical edge shaped to be received in a groove of a thread. The cone body includes a cap end and a bottom end opposite the cap end. The ground cone also includes a cap extending longitudinally from the cone body at the cap end and extending toward the bottom end. The cone body and the cap define a channel sized to receive an end of a conduit therein.

In another aspect, a ground cone for providing electrical contact to an interior of a conduit is provided. The ground cone includes a cone body including one or more tabs positioned on the cone body and extending radially outward from the cone body, the one or more tabs positioned separately from one another, at least one of the one or more tabs having an edge including a projection protruding radially outward from a remaining of the edge. The cone body includes a cap end and a bottom end opposite the cap end. The ground cone also includes a cap extending longitudinally from the cone body at the cap end and extending toward the bottom end. The cone body and the cap define a channel sized to receive an end of a conduit therein.

In one more aspect, a method of fabricating a conduit assembly is provided. The method includes providing a conduit, and providing a ground cone. The ground cone includes a cone body including one or more tabs positioned on the cone body and extending radially outward from the cone body, the one or more tabs positioned separately from one another. At least one of the one or more tabs having an edge including a projection protruding radially outward from a remaining of the edge. The cone body includes a cap end and a bottom end opposite the cap end. The ground cone also includes a cap extending longitudinally from the cone body at the cap end and extending toward the bottom end. The cone body and the cap define a channel sized to receive an end of a conduit therein. The method further includes coupling the ground cone with the conduit.

DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes assemblies and methods for fabricating a metal conduit assembly of an electrical system. Flexible conduits are depicted as examples for illustration purposes only. Assemblies and methods described herein may be applied with rigid conduits such as rigid metal conduits (RMC), intermediate metal conduits (IMC), or other types of rigid conduits. Method aspects will be in part apparent and in part explicitly discussed in the following description.

Conduit assemblies are constructed using fittings and conduits. Wiring is placed inside a conduit assembly for carrying electricity in an electrical system. To ensure the safety and performance of the assembly, certain tests on the assembly under various standards are required. For example, in a Underwriters Laboratories (UL) test, the conduit assembly fabricated with conduits and fittings is required to pass a set quantity of current, such as in a range from 470 Ampere (A) to 750 A, without failure or damages to the components of the conduit assembly. As part of the mechanism of ensuring the electrical continuity of the conduit assembly, a ground cone is used to provide and/or maintain electrical contact between interior of the conduit and the rest of the conduit assembly. A ground cone also provides and/or maintains physical contact of the conduit with the rest of the conduit assembly. Without a ground cone, the conduit may not be coupled with other components of the conduit assembly and the conduit assembly may fall apart.

Figure 1A:
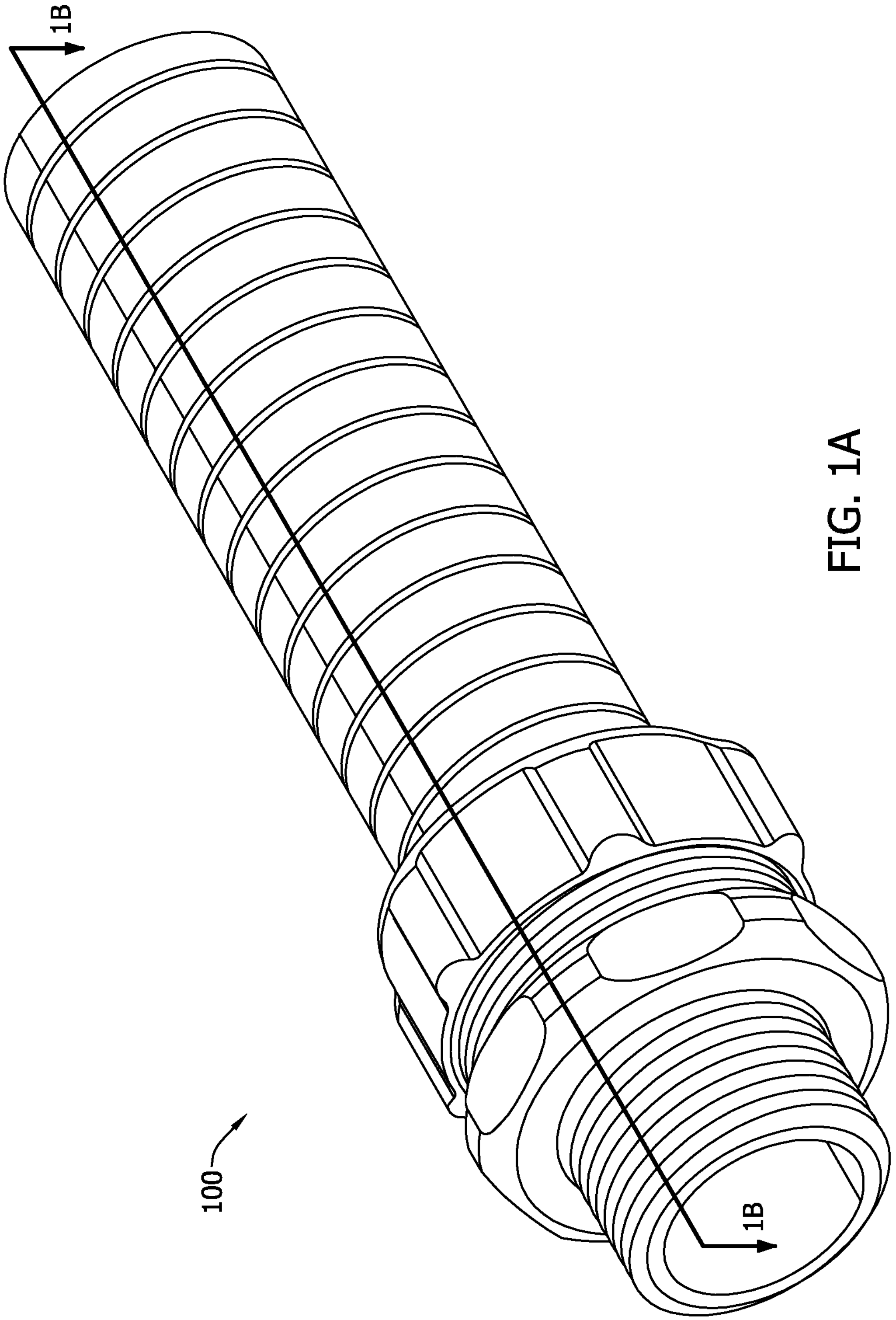
FIG. 1A is a conduit assembly.
Figure 1B:
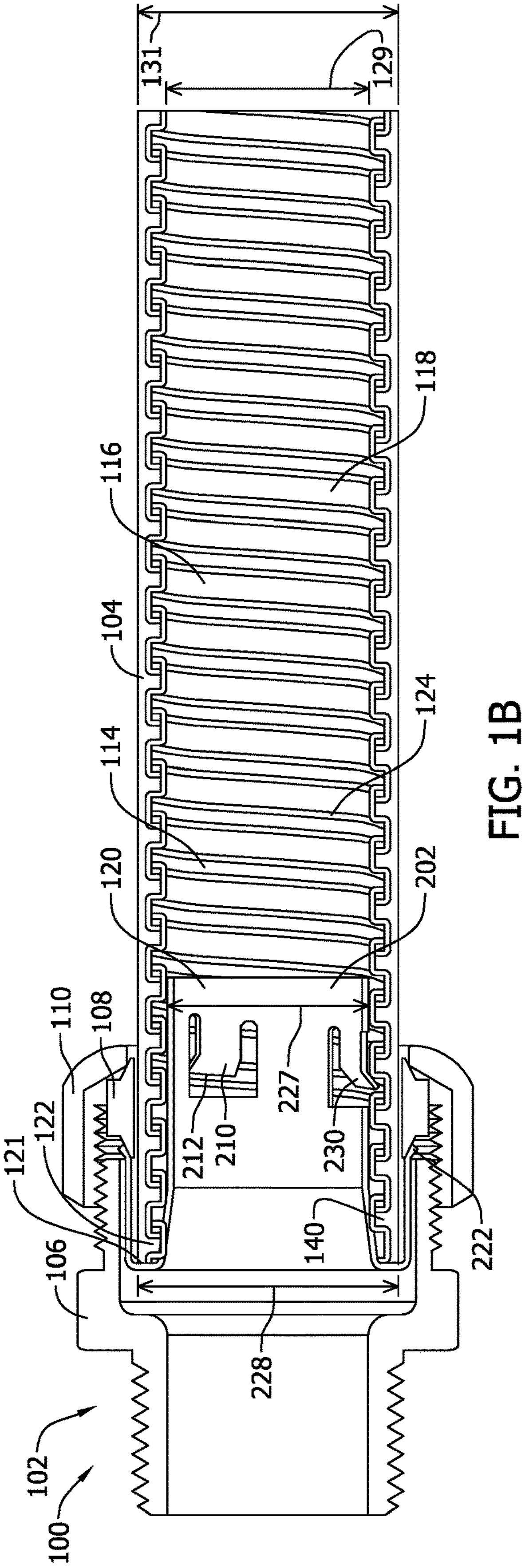
FIG. 1B is a cross-sectional view of the conduit assembly shown in FIG. 1A along cross-sectional line 1B-1B of FIG. 1A.
Figure 1C:
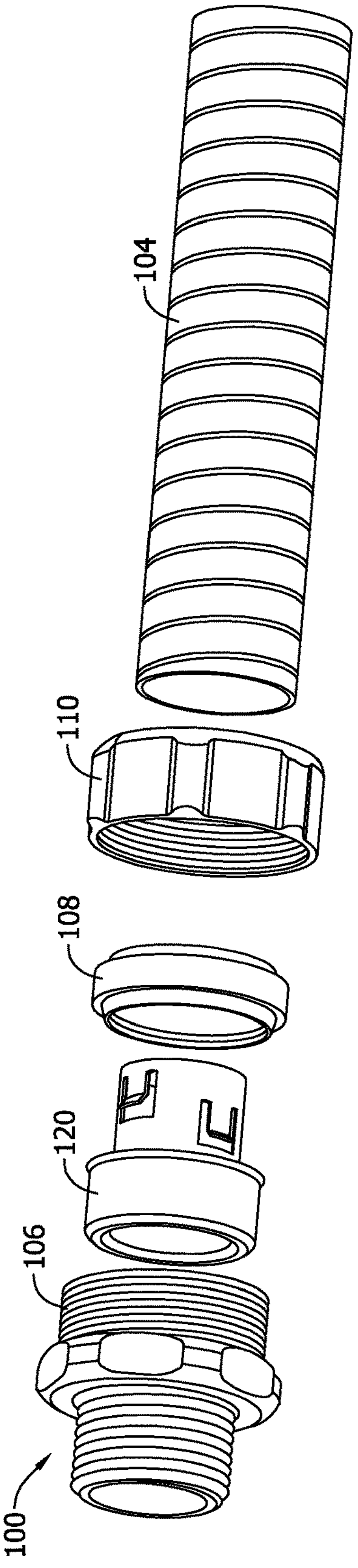
FIG. 1C is an exploded view of the conduit assembly shown in FIG. 1A.

FIGS. 1A-1C show a conduit assembly 100 including an example fitting assembly 102 coupled with a conduit 104. FIG. 1A is a perspective view of conduit assembly 100. FIG. 1B is a cross-sectional view of conduit assembly 100 along cross-sectional line 1B-1B of FIG. 1A. FIG. 1C is an exploded view of conduit assembly 100.

In the example embodiment, fitting assembly 102 includes a fitting body 106, a sealing ring 108, a gland nut 110, and a ground cone 120.

In operation, a cone body 202 (also see FIGS. 2A-2D described later) of ground cone 120 is inserted into conduit 104 and coupled with conduit 104. Fitting body 106 is capped over a mouth 122 of conduit 104 and gland nut 110 is coupled with fitting body 106 via threads of fitting body 106 and threads of gland nut 110. The sealing ring 108 is positioned proximate mouth 122, providing sealing of the assembly to limit water and other corrosive substances from being in contact with the junction and/or entering into the conduit to be in contact with the interior of conduit assembly 100 and wiring running through conduit 104. Fitting assembly 102 includes a grounding coupling (not shown) configured to be coupled with other components in fitting assembly 102. The grounding coupling is sized to receive a grounding conductor, providing grounding to conduit assembly 100. The grounding coupling is in electrical communication with other components of fitting assembly 102 via physical contact with fitting body 106 and/or gland nut 110. Fitting body 106 is in contact with gland nut 110. Fitting body 106 is also in contact with interior of the conduit 104 via ground cone 120. Ground cone 120 is configured to provide and/or maintain electrical contact between the interior of conduit 104 and the rest of conduit assembly 100. As a result, electrical continuity of conduit assembly 100 as a whole is ensured in passing a required quantify of current to meet the requirements under standards such as NEC (National Electrical Code). Ground cone 120 also provides and/or maintains physical contact of the conduit 104 with the rest of the conduit assembly 104. Without a ground cone, the conduit may not be coupled with other components of the conduit assembly, and the conduit assembly may fall apart. The wiring inside may be exposed as a result, compromising the performance and safety of the conduit assembly.

Figure 2A:
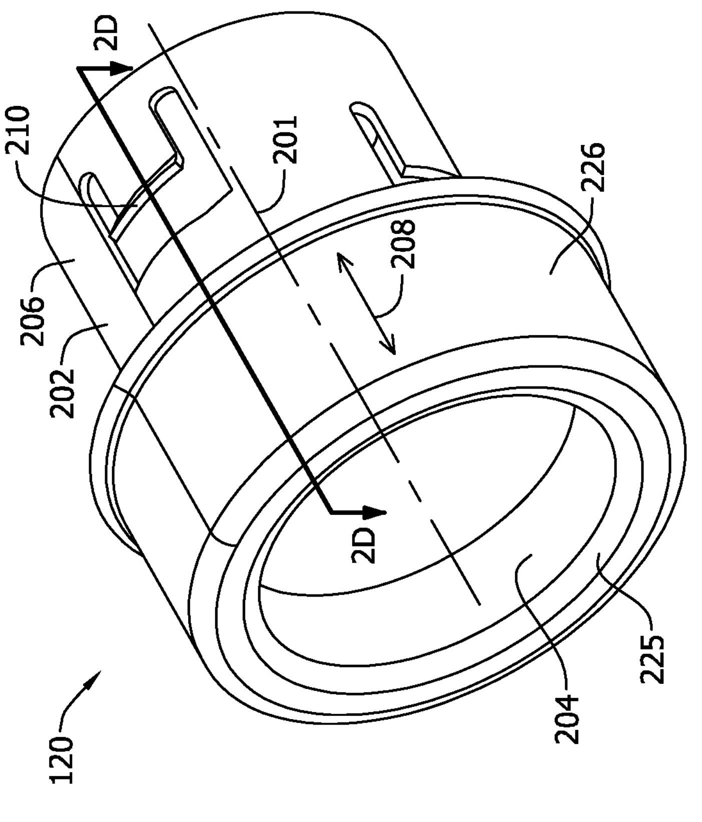
FIG. 2A is a perspective view of an example ground cone in the conduit assembly shown in FIG. 1A.
Figure 2B:
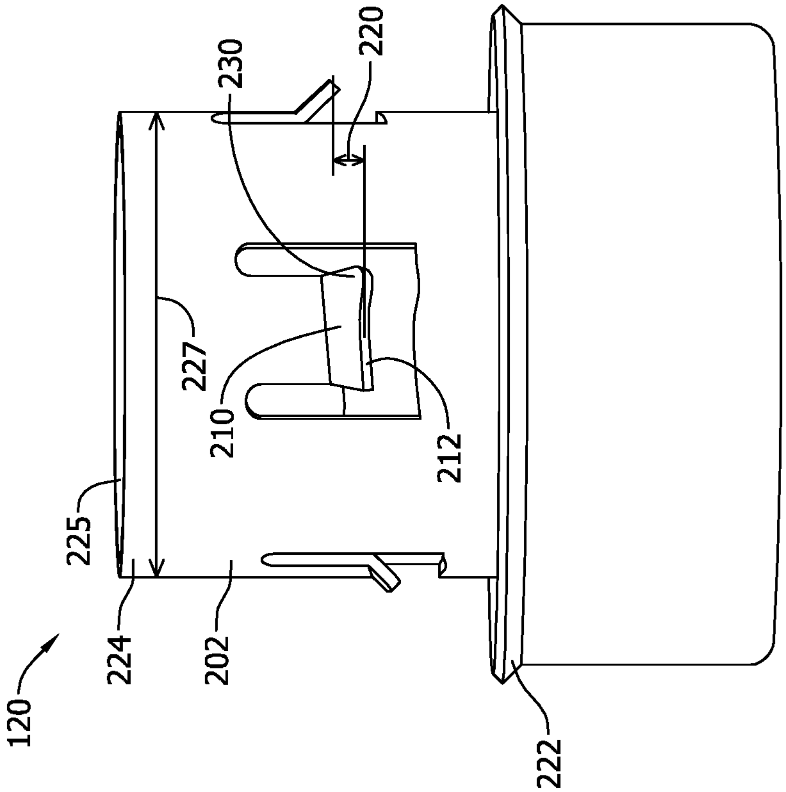
FIG. 2B is a side perspective view of the ground cone shown in FIG. 2A.
Figure 2C:
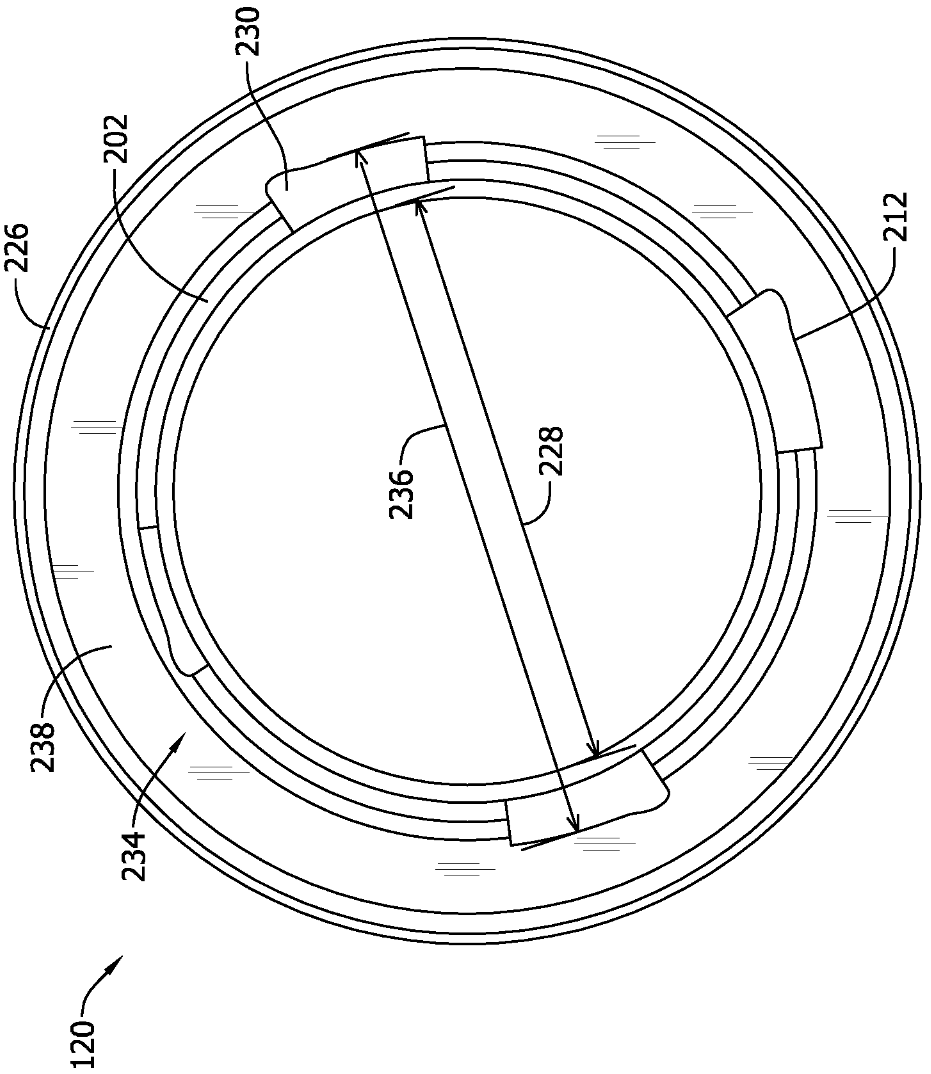
FIG. 2C is a bottom view of the ground cone shown in FIG. 2A.
Figure 2D:
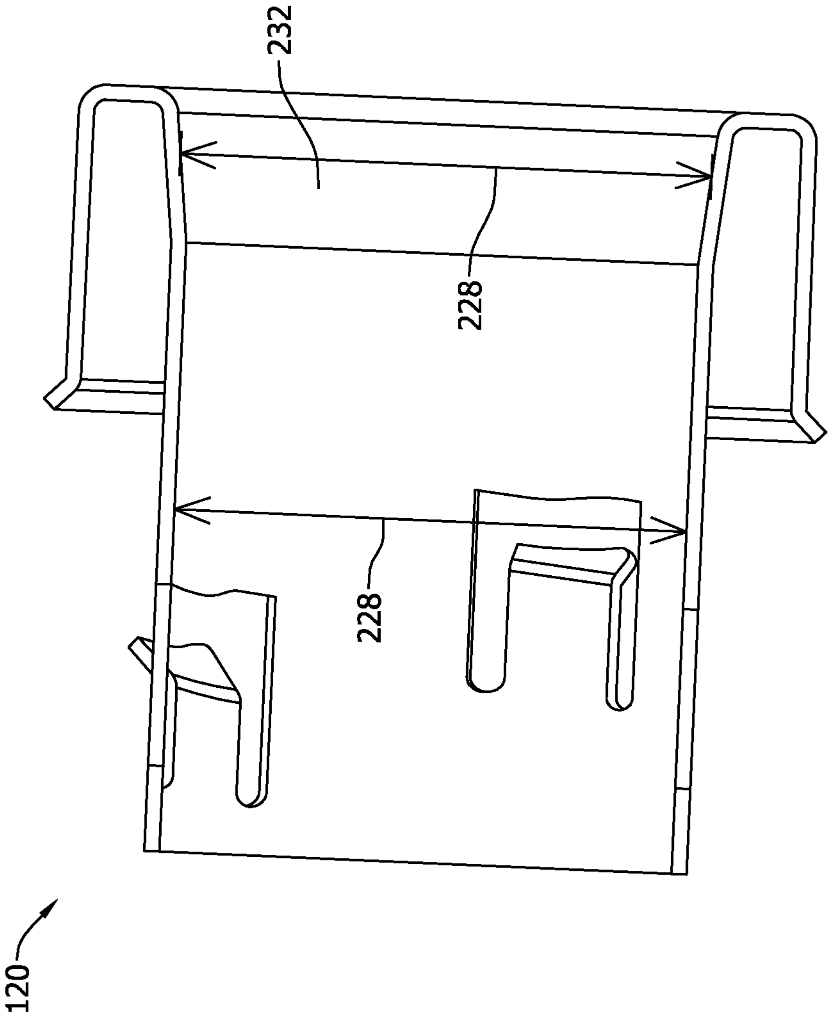
FIG. 2D is a cross-sectional view of the ground cone along cross-sectional line 2D-2D of FIG. 2A.

FIGS. 2A-2D show example ground cone 120. FIG. 2A is a perspective view of ground cone 120. FIG. 2B is a side perspective view of ground cone 120. FIG. 2C is a bottom perspective view of ground cone 120. FIG. 2D is a cross-sectional view of ground cone along line 2D-2D of FIG. 2A.

In the example embodiment, ground cone 120 includes a cone body 202. Cone body 202 may define a longitudinal axis 201. Cone body 202 is generally cylindrical. Cone body 202 may be conical. Cone body may be in other shapes, such as irregular shapes or polygonal, that enable ground cone 120 to function as described herein. Cone body 202 includes a cap end 204 and a bottom end 206 opposite cap end 204. Cap end 204 and bottom end 206 define a longitudinal direction 208 of cone body 202. Cone body 202 further includes one or more tabs 210 extending radially outward. Tabs 210 are positioned on cone body 202. Tab 210 may be constructed by cutting along sides of tab 210 and then bending the tab radially outward from the cuts. A portion of cone body 202 may be cut out. Alternatively, a cut may be made along sides of tab 210 without cutting out a portion of cone body 202 and the cut sides facilitate projecting tab 210 from cone body 202. Tab 210 includes an edge 212. Edge 212 may be a helical edge 212. Helical edge 212 is shaped to be received in a groove defined by threads. For example, helical edge 212 is complementary to a groove 114 of a thread 116 of an interior 118 of conduit 104 (see FIG. 1B) such that helical edge 212 may be rotated into groove 114 defined by threads 116 and engage with threads 116. Edges 212 are all depicted as helical as an example. In some embodiments, one or some edges 212 are helical while other edges 212 are in other shapes. In some embodiments, edges 212 are in shapes other than being helical.

In the example embodiment, ground cone 120 includes four tabs 210. Ground cone 120 may include other numbers of tabs 210, such as three or five, that enable ground cone 120 to function as described herein. Helical edges 212 may be shaped and positioned to be received in one thread, or a plurality of threads, by adjusting a longitudinal distance 220 between tabs 210. Longitudinal distance 220 may be the distance in longitudinal direction 208 between midpoints of edges 212 of neighboring tabs 210 (see FIG. 2B).

In a known ground cone, a helical edge is positioned at the very tip of ground cone. The arrangement presents difficulty in installing the ground cone into the conduit, because the helical edge needs to catch the threads of the conduit to assemble the ground cone with the conduit. The ground cone is sized complementary to the conduit and the threads of the conduit are in the interior of the conduit. It may be tricky for the helical edge to catch the interior threads. Further, when the helical edge finally catches the threads, the ground cone may not be centered.

In contrast, in the example embodiment, cone body 202 includes a leading portion 224 at bottom end 206. Leading portion 224 is positioned longitudinally further away from cap 226 than helical edges 212. Leading portion 224 is cylindrical. Alternatively, leading portion 224 is conical, where outer diameter 227 reduces toward a body edge 225 of cone body 202. To couple ground cone 120 with conduit 104, leading portion 224 enters into interior 118 of conduit 104 before helical edge 212, facilitating the centering and alignment of ground cone 120 in conduit 104 to guide helical edges 212 to engage threads 116, thereby increasing the convenience of installation.

In the example embodiment, edge 212 may further include a projection 230 extending further radially outward than the remaining edge 212. When ground cone 120 is coupled with conduit 104, projections 230 project further into interior 118 of conduit 104 than the remaining edge 212 (see FIG. 1B). Because projections extend further radially outward, projections 230 may scrap away corrosion on interior 118 during the coupling process when ground cone 120 is pushed or rotated into conduit 104, thereby increasing the electrical contact between ground cone 120 and conduit 104. Projection 230 is depicted with helical edge 212 as an example for illustration purposes. Projection 230 may be positioned on edge 212 in other shapes, such as an arch or a line, that enable ground cone 120 to function as described herein. Each edge 212 is depicted as including a projection 230 as an example for illustration purposes. In some embodiments, some of edges 212 include projections 230 and other edges 212 do not include projections 230.

In the example embodiment, cone body 202 includes a bulging portion 232 (see FIG. 2D). At bulging portion 232, cone body 202 slanted radially outward such that an inner diameter 228 of cone body 202 at bulging portion 232 is greater than inner diameter 228 at other portion of cone body 202. Bulging portion 232 is advantageous in strengthening electrical contact between ground cone 120 with wall 124 of conduit 104. When ground cone 120 is assembled with conduit 104, bulging portion 232 pushes against wall 124, thereby strengthening electrical contact between ground cone 120 and conduit 104. In some embodiments, cone body 202 does not include a bulging portion 232.

In the example embodiment, ground cone 120 further includes a cap 226 extending from cone body 202. Cap 226 may extend radially outward away from body edge 225 of cone body 202 and then longitudinally away from body edge 225 toward bottom end 206 of cone body 202. As such, cap 226 curves around from body edge 225 of cone body 202. Cap 226 and cone body 202 define a channel 234 (FIG. 2C) sized to receive a mouth 122 of conduit 104 therein.

In some embodiments, cap 226 includes a flange 222 extending radially outward from the remaining cap 226. Flange 222 presses against sealing ring 108 to provide sealing of conduit assembly (see FIG. 1B).

In the example embodiment, ground cone 120 is formed as one single piece. Ground cone 120 may be formed by a simple manufacturing process of stamping from sheet metal, providing an economical manufacturing option for manufacturing ground cones 120 in an industrial scale. Single piece ground cones 120 are also advantageous in assembling of the conduit assemblies, because coupling individual pieces of a ground cone together at the site is eliminated, thereby reducing cost in labor, equipment, and material.

In the example embodiment, ground cone 120 is fabricated with an electrically-conductive material. Example material is metal.

Referring back to FIGS. 1A-1C, ground cone 120 is used to establish and/or maintain electrical connection between interior 118 of conduit 104 and the rest of conduit assembly 100. In the field, fittings and conduits are in various standardized trade sizes, where the trade size may refer to the approximate inner or outer diameter of the conduit or the approximate inner diameter of the mouth of the fitting. Ground cone 120 may be sized in the same manner such that a ground cone at a certain trade size fits with a conduit of the same trade size. For example, a ground cone of size ¾ is sized to fit with a conduit of size ¾. An outer diameter 227 of ground cone 120 at cone body 202 is smaller than an inner diameter 129 of conduit 104, and an inner diameter 228 of ground cone at cap 226 is greater than an outer diameter 131 of conduit 104. As a result, an end 140 of conduit 104 is nestled between cap 226 and cone body 202. A curve defined by edges 212 has a dimension such as a diameter 236 (see FIG. 2C) greater than inner diameter 129 of conduit 104, such that helical edges 212 are received in grooves 114 of threads 116 and engage with threads 116 and/or projections 230 engage with interior 118 of conduit 104, establishing and/or strengthening the electrical contact between ground cone 120 and interior 118 of conduit 104. Further, at bulging portion 232, outer diameter 227 of cone body 202 may be bulged from being smaller than an inner diameter 129 of conduit 104 to being greater than inner diameter 129, thereby pressing against conduit 104 when ground cone 120 is coupled with conduit 104.

In the example embodiment, assembling conduit assembly 100 is simplified with ground cone 120. To assemble ground cone 120 with conduit 104, cone body 202 may be pushed or rotated into conduit 104. Cone body 202 may be coupled into conduit 104 until an edge 121 of mouth 122 of conduit 104 becomes in contact with channel bottom 238 of channel 234 of ground cone 120. Helical edges 212 are received in grooves 114 defined by interior threads 116 of conduit 104. The contact between ground cone 120 and interior 118 of conduit 104 is strengthened by projections 230, where projections 230 digs into wall 124 of conduit 104 and provide strengthened electrical contact between ground cone 120 and interior 118 of conduit 104. The contact is further strengthened by bulging portion 232, where bulging portion 232 pushes against interior 118 of conduit 104. Strengthened electrical contact is advantageous in passing current test required by standards.

Flexible metal conduits are depicted as example for illustration purposes only. Assemblies and methods described herein may be applied with rigid conduits. When conduit 104 does not include interior threads 116, to couple ground cone 120 with conduit 104, cone body 202 is inserted into interior 118 of conduit 104 and is pushed into conduit 104 by applying force at cap 226. The friction and the engagement of projections 230 with interior wall 124 of conduit 104 provide the coupling force and electrical contact between ground cone 120 and interior 118 of conduit 104.

Figure 3:
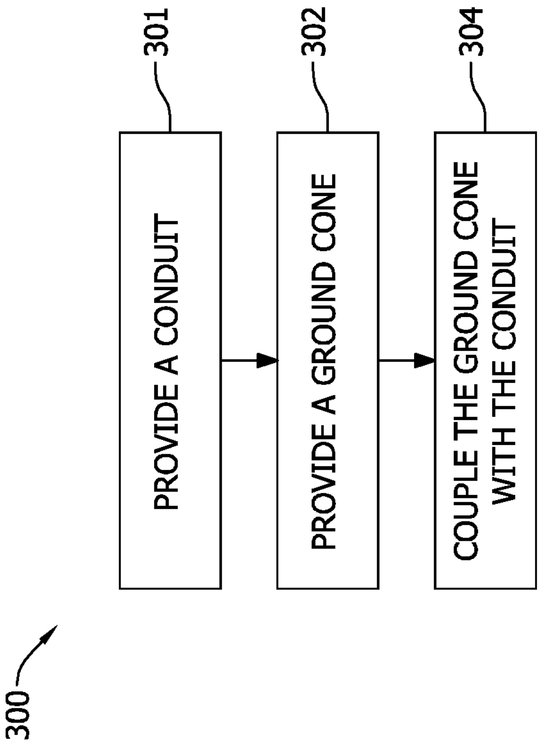
FIG. 3 is a flow chart of an example method of fabricating a conduit assembly using the ground cone shown in FIGS. 1A-2D.

FIG. 3 is a flow chart of an example method 300 of assembling a conduit assembly. In the example embodiment, method 300 includes providing 301 a conduit 104. Method 300 also includes providing 302 a ground cone. Ground cones 120 described above may be used. Method 300 further includes coupling 304 the ground cone with the conduit. Ground cone 120 may be pushed into conduit 104 to be coupled with conduit 104. For example, ground cone 120 is pushed into conduit 104 and edges 212 of tabs 210 are received in grooves of threads 116. If projections 230 are included in ground cone 120, projections 230 engage with interior 118 of conduit, coupling with conduit 104 without the requirement of interior threads 116 on conduit 104. Ground cone 120 may be rotatably coupled with conduit 104 by engaging helical edges 212 of ground cone 120 with threads 116 of conduit 104. Leading portion 224 eases the coupling. During assembling, leading portion 224 is inserted into conduit 104 before tabs 210. Leading portion 224 has a smaller diameter than end 140 of conduit 104, and therefore may be inserted into conduit 104 with ease. The cylindrical or conical shape of leading portion 224 facilitates the alignment of cone body 202 with end 140 of conduit 104 such that cone body 202 is centered when edges 212 engage with threads 116 on interior 118 of conduit 104. Cap 226 and channel 234 of cone body serves as a stopper that prevents ground cone 120 from being inserted too far into conduit.

At least one technical effect of the systems and methods described herein includes (a) a ground cone that may be coupled with a conduit by being pushed in or rotatably coupled with the conduit; (b) a ground cone including helical edges for facilitating rotatable coupling, (c) a ground cone including projections for increased electrical contact, (d) a ground cone including a bulging portion for increased electrical contact, and (e) a ground cone including a leading portion to facilitate the rotatable coupling.

Example embodiments of assemblies and methods for fabricating conduit assemblies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A ground cone for providing electrical contact to an interior of a conduit, comprising:

a cone body comprising one or more tabs positioned on the cone body and extending radially outward from the cone body, the one or more tabs positioned separately from one another, at least one of the one or more tabs having a helical edge, the helical edge shaped to be received in a groove of a thread, the cone body comprising a cap end and a bottom end opposite the cap end; and a cap extending longitudinally from the cone body at the cap end and extending toward the bottom end, wherein the cone body and the cap define a channel sized to receive an end of a conduit therein.

2. The ground cone of claim 1, wherein the helical edge further comprises a projection protruding radially outward from a remaining of the helical edge.

3. The ground cone of claim 1, wherein the cone body comprises a bulging portion extending radially outward from a remaining of the cone body.

4. The ground cone of claim 1, wherein the cone body comprises a leading portion positioned at the bottom end of the cone body and positioned longitudinally further away from the cap than the helical edge.

5. The ground cone of claim 1, wherein the cone body comprises a plurality of tabs, the helical edges of the plurality of tabs shaped to be received in grooves of threads.

6. The ground cone of claim 1, wherein the ground cone is integrally formed into one single piece.

7. The ground cone of claim 1, wherein the cap further comprises a flange extending radially outward away from a remaining of the cap.

8. A ground cone for providing electrical contact to an interior of a conduit, comprising:

a cone body comprising one or more tabs positioned on the cone body and extending radially outward from the cone body, the one or more tabs positioned separately from one another, at least one of the one or more tabs having an edge comprising a projection protruding radially outward from a remaining of the edge, the cone body comprising a cap end and a bottom end opposite the cap end; and a cap extending longitudinally from the cone body at the cap end and extending toward the bottom end, wherein the cone body and the cap define a channel sized to receive an end of a conduit therein.

9. The ground cone of claim 8, wherein at least one of the edges is a helical edge, the helical edge shaped to be received in a groove of a thread.

10. The ground cone of claim 9, wherein the cone body comprises a plurality of tabs, the helical edges of the plurality of tabs shaped to be received in grooves of threads.

11. The ground cone of claim 8, wherein the cone body comprises a bulging portion extending radially outward from a remaining of the cone body.

12. The ground cone of claim 8, wherein the cone body comprises a leading portion positioned at the bottom end of the cone body and positioned longitudinally further away from the cap than the edge.

13. The ground cone of claim 8, wherein the ground cone is integrally formed into one single piece.

14. The ground cone of claim 8, wherein the cap further comprises a flange extending radially outward away from a remaining of the cap.

15. A method of fabricating a conduit assembly, comprising:

providing a conduit;

providing a ground cone, wherein the ground cone includes:

a cone body including one or more tabs positioned on the cone body and extending radially outward from the cone body, the one or more tabs positioned separately from one another, at least one of the one or more tabs having an edge comprising a projection protruding radially outward from a remaining of the edge, the cone body including a cap end and a bottom end opposite the cap end; and a cap extending longitudinally from the cone body at the cap end and extending toward the bottom end, wherein the cone body and the cap define a channel sized to receive an end of the conduit therein; and coupling the ground cone with the conduit.

16. The method of claim 15, wherein the coupling further comprises:

pushing the cone body into the conduit such that the projection engages with the conduit.

17. The method of claim 15, wherein at least one of the edges is a helical edge, the helical edge shaped to be received in a groove of a thread of the conduit, and the coupling further comprises rotatably coupling the ground cone with the conduit by:

engaging the helical edge with the thread of the conduit.

18. The method of claim 17, wherein the cone body includes a plurality of tabs, the helical edges of the plurality of tabs shaped to be received in grooves of threads of the conduit, and the coupling further comprises rotatably coupling the ground cone with the conduit by:

engaging the helical edges with the threads of the conduit.

19. The method of claim 15, wherein the cone body includes a bulging portion extending radially outward from a remaining of the cone body, and the coupling further comprising:

coupling the ground cone with the conduit such that the bulging portion presses against the conduit.

20. The method of claim 15, wherein the cone body includes a leading portion positioned at the bottom end of the cone body and positioned longitudinally further away from the cap than the edge, and the coupling further comprising:

inserting the leading portion into the conduit; and coupling the one or more tabs with the conduit.

* * * * *